US007003332B2

(12) United States Patent
Linn

(10) Patent No.: US 7,003,332 B2
(45) Date of Patent: Feb. 21, 2006

(54) METHOD AND SYSTEM FOR DECREASING POWER-ON TIME FOR SOFTWARE-DEFINED RADIOS

(75) Inventor: Charles Alan Linn, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 475 days.

(21) Appl. No.: 10/271,542

(22) Filed: Oct. 17, 2002

(65) Prior Publication Data

US 2006/0014574 A1 Jan. 19, 2006

(51) Int. Cl.
*H04B 1/38* (2006.01)

(52) U.S. Cl. .................. 455/574; 455/343.1; 340/7.32

(58) Field of Classification Search ................ 455/574, 455/343.1, 343.2, 343.3, 343.4, 343.5, 343.6; 340/7.32; 713/300, 320, 321
See application file for complete search history.

(56) References Cited

U.S. PATENT DOCUMENTS 5,920,728 A 7/1999 Hallowell et al.
6,115,823 A 9/2000 Velasco et al.
6,212,398 B1 * 4/2001 Roberts et al. ............. 455/502
6,337,719 B1 * 1/2002 Cuccia ....................... 348/731
6,343,222 B1 * 1/2002 Jones ......................... 455/574
6,684,083 B1 * 1/2004 Harimoto ................. 455/556.1

* cited by examiner

*Primary Examiner*—Charles Appiah

*Assistant Examiner*—Nghi H. Ly

(74) *Attorney, Agent, or Firm*—Mark C. Comtois; Duane Morris, LLP

(57) ABSTRACT

A technique for decreasing the amount of time needed to turn on a software-defined radio provides an operator of the radio the ability to turn the radio off and subsequently turn the radio on, wherein the radio is turned on much more quickly than a radio not using the herein described technique. The technique places the radio in a suspended state when off and retains selected parameters associated with selected applications and software portions. Preferably, the radio is placed in a low power consumption state concurrently with the suspended state. Thus the radio conserves power, thus increasing battery life. When the operator turns the radio on, the radio is restored to a fully function state utilizing the retained parameters.

16 Claims, 2 Drawing Sheets

METHOD AND SYSTEM FOR DECREASING POWER-ON TIME FOR SOFTWARE-DEFINED RADIOS

BACKGROUND

The present invention is generally related to radios, and more specifically related to software-defined radios. The desire to increase functionality and programmability in radio systems has lead to the evolution of software radios. Software radios implement selected functions in software that have typically been implemented in hardware. Software radios provide a higher degree of flexibility than hardware radios. Typically, radios are classified as hardware radios, software-based radios, or software-defined radios. Software radios include less hardware and more software than hardware radios, but remain operationally constrained by the hardware present. Software-defined radios include less hardware than software radios and more software than software-based radios, and often can change complete functions or modulation characteristics by adding, changing or updating software. Thus, software-defined radios typically provide the most flexibility and programmability of these three types of radios.

Software-defined radios can take a relatively long time (compared to hardware radios and software-based radios) to become fully operational from a powered-down state. The time needed for the software-defined radio to become fully functional after power is turned on can become longer as more (and more complex) software functions are added to the software-defined radio. This is analogous to adding software to a desktop computer. As the amount of software increases and the complexity of the software increases, the time needed to turn the computer on increases.

The amount of time needed to turn on a software-defined radio is of particular concern in military applications. For example, a military hand held radio may be implemented as a software-defined radio. Military hand held radios are often used in the field for long periods of time operating on battery power. Thus, it is not uncommon for an operator to turn the radio off to conserve power and prolong battery life. Under some conditions, it is desired that the military radio be able to be turned on as quickly as possible, and lengthy power on times can not be tolerated. An example of such a condition is when an operator of a military hand held radio is under attack. While under attack, the operator may desire to turn the radio on and transmit a signal indicating his location and the fact that he needs help. Under such conditions, long power-on times may cost the operator his life. A technique for decreasing the amount of time needed to turn on a software-defined radio is desired.

In one embodiment, a method for decreasing power-on time of a software-defined radio comprising a hardware portion, an application portion, and an operating environment portion includes removing electrical power from at least one hardware component of the hardware portion in response to a power-off signal. The application portion is configured to be in an application-portion suspended state in response to the power-off signal, wherein selected application parameters are retained in the application portion. The operating environment is configured to be in an operating-environment-suspended state in response to the power-off signal, wherein selected operating environment parameters are retained in the operating environment portion. Power is restored to at least one hardware component of the hardware portion in response to a power-on signal. The application portion, is restored to an application-portion-operational state utilizing the retained selected application portion parameters in response to the power-on signal. The operating environment portion is restored to an operating-environment-portion operational state utilizing the retained selected operating environment parameters in response to the power-on signal.

In another embodiment a system for decreasing power-on time of a software-defined radio includes a power control portion, a fast-on control portion, an application portion, an operating environment portion, and a hardware portion. The power control portion is configured to receive a selected power status of the software-defined radio and either provide power to selected portions of the software-defined radio or remove power from selected portions of the software-defined radio in response to the selected power status. The fast-on control portion is configured to configure selected portions of the software-defined radio to be in either a suspended state or an operational state in response to the selected power status. The application portion includes radio-related applications, wherein selected radio-related applications are configured to be in either a suspended state or an operational state responsive to the selected power status. The operating environment portion includes radio-related software portions, wherein selected radio-related software portions are configured to be in either a suspended state or an operational state responsive to the selected power status. The hardware portion includes hardware components, wherein power to selected hardware components is either provided and removed in response to the selected power status.

DETAILED DESCRIPTIONS

A method and system for decreasing the amount of time needed to turn on a software-defined radio as described herein is essentially transparent to an operator of the software-defined radio. For example, the operator may turn the software-defined radio off and on using the existing on/off switch. However, when the operator turns the software-defined radio off, selected portions of the software-defined radio are placed into various suspended (and optionally low power consumption) states. Also, selected parameters used to perform predetermined functions of the software-defined radio are retained. When an operator turns the software-defined radio on, the selected portions of the software-defined radio are restored to a fully functional state using the retained parameters. Utilizing this “fast-on” technique, the software-defined radio becomes fully functional more quickly than if electrical power was completely removed from the software-defined radio when the operator turned the software-defined radio off.

Although the following description is in terms of a software-defined radio, it is to be understood that the “fast-on” technique is not limited thereto. This “fast-on” technique is applicable to any equipment having portions that may be placed into suspended/low power consumption states while retaining selected parameters. Examples of such equipment include, general purpose processors, processors designed to perform specific functions, radios implemented primarily in hardware (hardware radios), and software radios (radios having a more hardware than software-defined radios and having less hardware than hardware radios.

Figure 1:
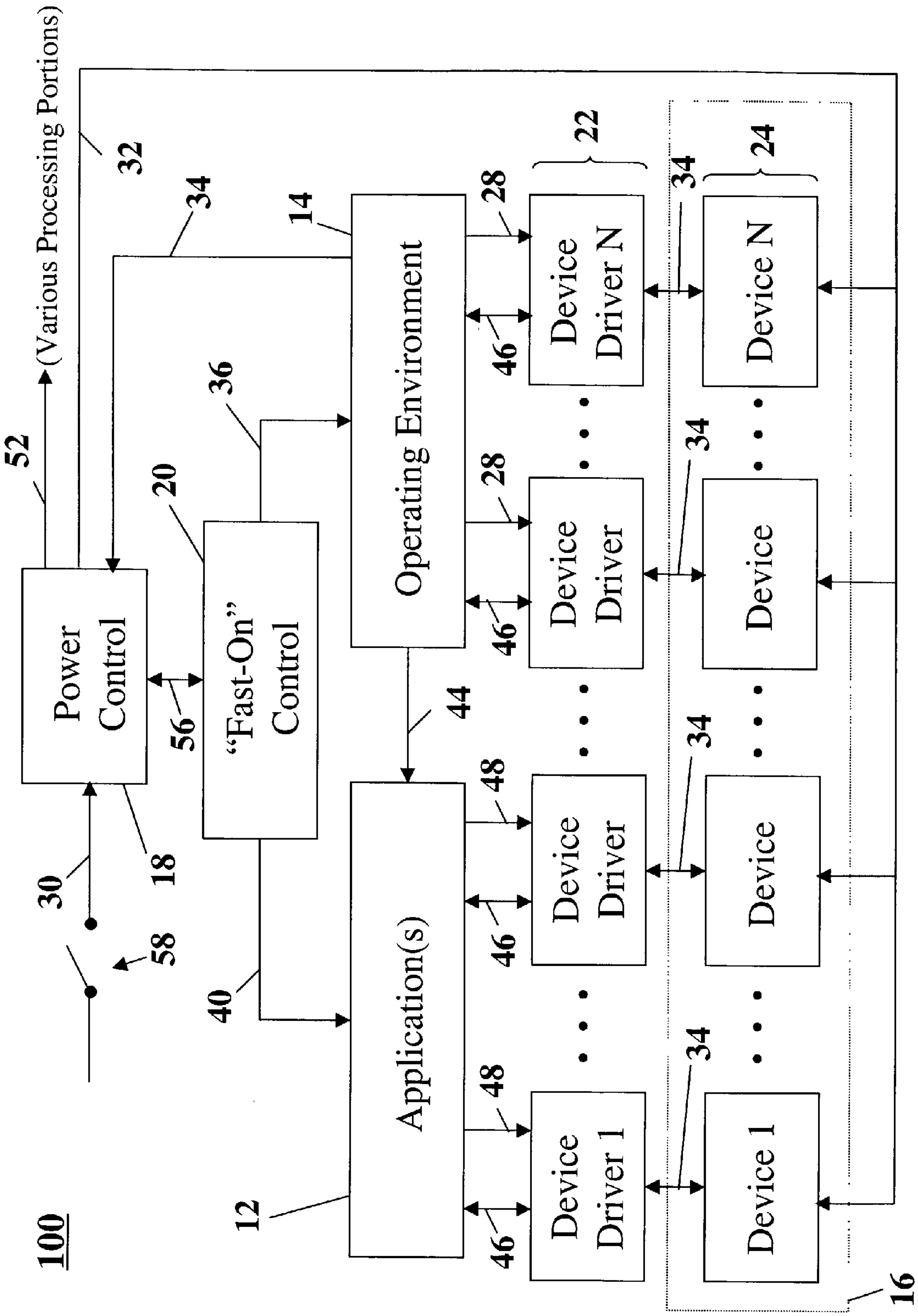
FIG. 1 is a functional block diagram of an embodiment of a system for decreasing the amount of time needed to turn on a software-defined radio in accordance with the present invention.

Referring now to FIG. 1, there is shown a functional block diagram of a system 100 for decreasing the amount of time needed to turn on a software-defined radio in accordance with the present invention. The system 100 comprises an application portion 12, an operating environment portion 14, hardware portion 16, and a "fast on" control portion 20. The application portion 12 includes applications implemented in software for performing selected radio-related functions. The applications included in the application portion 12 may comprise any application capable of being implemented in software. Examples of such applications applicable to a radio systems include frequency modulation (e.g., frequency modulated voice), amplitude modulation, data communications, global positioning system (GPS) position reports, frequency hopping, or a combination thereof.

The operating environment portion 14 controls the initialization and launch of the applications in the application portion 12. Initialization involves loading respective software for an application, such that the application is capable of performing its designed functions, upon receipt of selected parameters. These selected parameters are provided to an application in the application portion 12 during the launch process. For example, an application called FM voice is designed to perform the functions of filtering and modulating (among others functions) of a signal indicative of voice. The operating environment portion 14 initializes the FM voice application by provided the software used to implement the FM voice application to the applications portion 12. However, the initialized software does not contain all the parameters needed to be fully functional. For this example, the FM voice application needs parameters such as the filtering bandwidth (controls quality of transmitted voice) and modulation center frequency (selects transmission channel) to perform its functions. These parameters are provided to the FM voice during the initialization process.

The hardware portion 16 comprises hardware components 24. The hardware components 24 may include hardware devices applicable to radio systems. Examples of hardware components 24 include devices such as transmitters (e.g., device 1), receivers, analog to digital converters, digital to analog converters, amplifiers (e.g., device N), or a combination thereof. The device drivers 22 perform functions related to the control of devices 24 by respective applications residing in application portion 12 or respective software residing in operating environment portion 14. For example, the FM voice application may provide a signal 46 to a respective device driver 22 for controlling the center frequency of a transmitter (device 24) via signals 34. The FM voice application (residing in the applications portion 12) provides this center frequency signal to the respective device driver 22, which in turn provides appropriate control signal(s) 34 to the transmitter 24 for transmission at the selected center frequency. Optionally, the device driver 22 may provide, via the signal 46, an indication that the center frequency information has been sent to the device 24.

As shown in FIG. 1, the power control portion 18 receives a power status signal 30, indicative of the selected power status of the system 100. An operator may turn the system on and off utilizing a switch 58, for example. The power status signal 30 is indicative of the operator's selection to turn the system on or off (power status). The power control portion 18 receives the power status signal 30 and provides signals for subsequent configuring of the hardware portion 16 via the signal 32, the application portion 12 via the signals 56 and 40, the operating environment portion 14 via the signals 56 and 36, and various other processing portions of the radio via the signal 52, to be in either a suspended state (possibly including a low-power consumption state), or to be in a fully functional processing state. The "fast-on" control portion 20 receives the signal 56, which is indicative of the selected power status. Also, the "fast-on" processor 20 may send status information, indicative of the status of the suspended state of the system, to the power control portion 18 via the signal 56. Upon receipt of the operator's desired on/off status (via the signal 56), the "fast-on" control portion provides signals 36 and 40 to the operating environments portion 14 and the applications portion 12, respectively, for either configuring the applications portion 12 and the operating environment's portion 14 into respective low power consumption states, while maintaining selected parameters associated with selected applications and operating environment's software routines, or restoring functionality to either the previous functional state or a predetermined state. Thus, when an operator turns the system 100 off, the hardware portion 16, the application portion 12, and the operating environment portion 14 are placed into low power consumption states, while selected parameters are retained. In one embodiment, the components 24 in the hardware portion 16 are turned off via signal 32. Turning the hardware components 24 off may include removing all power from the components 24, removing all power except for a small amount of power to maintain an electrical charge on selected electrical circuit devices, such as capacitors, or a combination thereof. When the operator subsequently turns the system 100 on, functionality is restored to the application portion 12, the operating environment 14, and the hardware portion 16, from the previously configured low power consumption states. Retention of the predetermined parameters during the low power states provides the system 100 with the capability to be in a fully functional state more quickly than if electrical power was completely removed from the application portion 12, the operating environment 14, and the hardware portion 16, and no parameters were retained.

Figure 2:
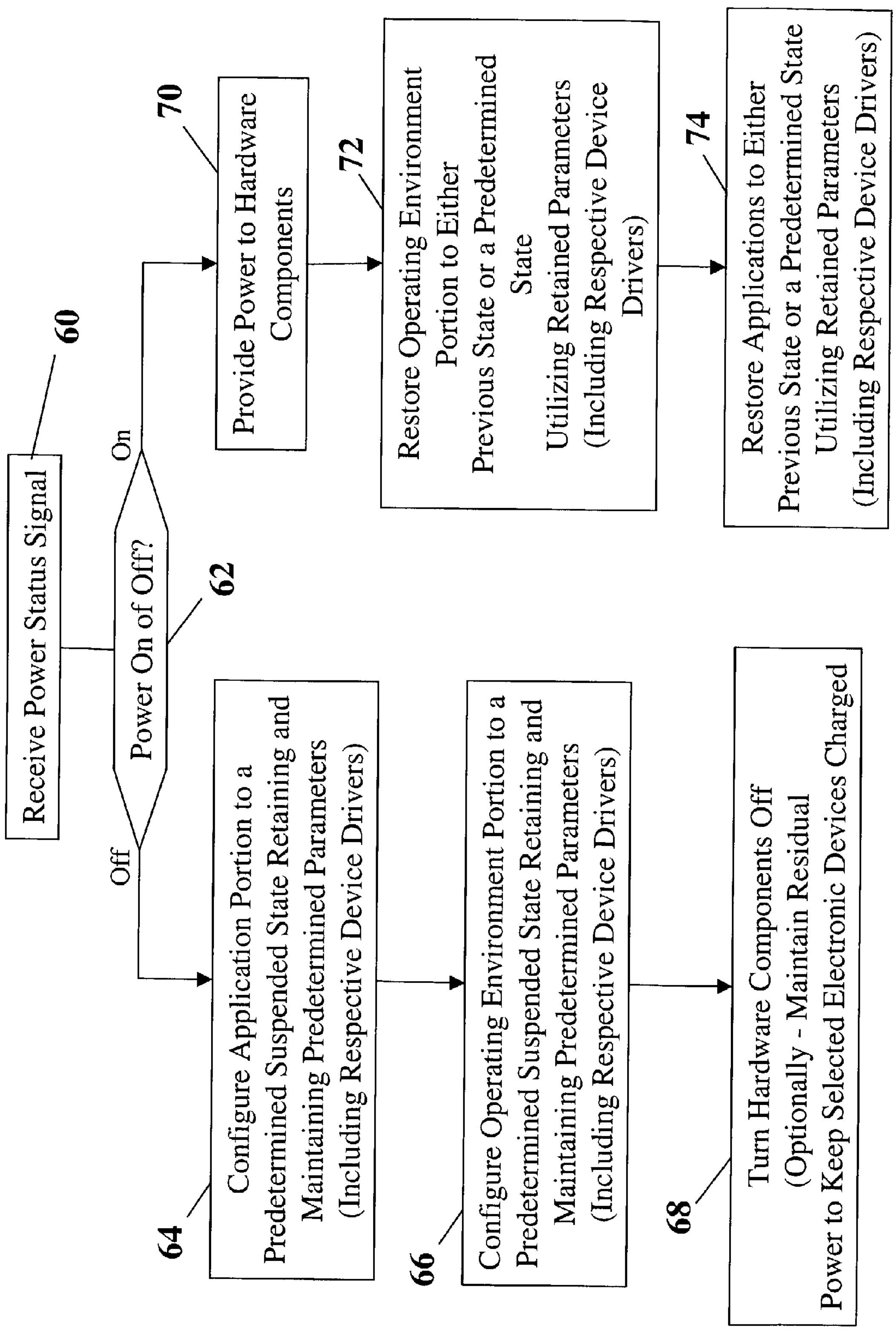
FIG. 2 is a flow diagram of an exemplary process for decreasing the amount of time needed to turn on a software-defined radio in accordance with the present invention.

FIG. 2 is a flow diagram of an exemplary process for decreasing the amount of time needed to turn on a software-defined radio in accordance with the present invention. It is to be understood that the order of the steps 64 through 74 is exemplary. For example, steps 64, 66, and 68 may be performed in any sequence, or performed concurrently, also steps 70, 72, and 74 may be performed in any sequence, or performed concurrently. The steps of FIG. 2 are described using the system 100 shown in FIG. 1. The power status signal 30, indicative of a selected power status, is received at step 60. The signal 30 may be indicative of an operator selected power status, an automatically selected status (e.g., turn power off due to overheating), or a combination thereof. Upon receipt of the power status signal 30, power control portion 18 determines if the system is to be turned on or off at step 62.

If the selected power status is off (step 62), the application portion 12 is configured to be in a suspended state at step 64. Selected applications residing in the application portion 12 are configured to be in a suspended state retaining and maintaining predetermined parameters for each respective selected application. For example, the application, FM voice, may be placed in a suspended state, retaining the parameters pertaining to specific filter coefficients and center frequency values. Indication that the application portion 12 is in a suspended state is sent to respective device drivers 22 via the control signals 48. The application portion 12 basically tells respective device drivers 22, via the control signals 48, to prepare to be in a suspended state. In each device driver placed in a suspended state, performance of each respective application is suspended, and selected parameters are retained. Retaining selected parameters facilitates restoration of the respective application more quickly than if no parameters were retained. For example, if the FM voice application is placed in a suspended state, the respective device driver 22 is sent control information to suspend the processing of voice information via the signal 46. Communications between the application portion 12 and a respective device driver 22 via the signal 46 is suspended. Selected parameters in each respective device driver 22 are retained and maintained to facilitate restoration of the application more quickly than if no parameters were retained in the device driver 22. In the FM voice application example, the respective device driver 22 may be instructed to retain selected parameters, such as values pertaining to the center frequency and data rates. Each device driver 22, in a suspended state, suspends communication with its respective device 24 via signal 34, during the suspend state.

It is advantageous if application portion 12 and device drivers 22 are placed in a low power consumption state during the suspended state. Placing the application portion 12 and the device drivers 22 in a low power consumption state conserves battery power and prolongs battery life (particularly advantageous in hand held radios). Placing application portion 12 and device drivers 22 in a low power state may include completely removing power from the application portion 12 and the device drivers 22, providing residual power to maintain an electrical charge on selected electronic devices (e.g., capacitors, memory devices, programmable gate arrays, time of day clocks, and liquid crystal displays), stopping a device clock (e.g., microprocessor clock), slowing the clock speed of a device clock, or a combination thereof.

The operating environment portion 14 is configured to be in a suspended state at step 66. Selected software portions residing in the operating environment portion 14 are configured to be in a suspended state retaining and maintaining predetermined parameters for each respective selected software portion. For example, if the operating environment portion 14 has initialized and launched only the FM voice application at the time the operating environment portion 14 receives, via the signal 36, instructions to go into a suspended state, no other applications will be initialized and/or launched. Parameters used by the operating environment portion 14 to maintain the FM voice application will be retained. Retaining these parameters in the operating environment portion 14 facilitates restoration of the FM voice application and associated functions performed by the operating environment portion 14 more quickly than if no parameters were retained. Indication that the operating environment portion 14 is in a suspended state, preparing to be in a suspended state, or a combination thereof, may be conveyed to respective device drivers 22 via the control signals 28. The operating environment portion 14 basically tells respective device drivers 22, via the control signals 28, to prepare to be in a suspended state. In each device driver placed in a suspended state, performance of each respective software portion of the operating environment 14 is suspended, and selected parameters are retained. Retaining selected parameters facilitates restoration of the respective application more quickly than if no parameters were retained. During the suspend state, communications between the operating environment portion 14 and a respective device driver 22 via the signal 46 is suspended. Selected parameters in each respective device driver 22 are retained and maintained to facilitate restoration of the software portion of the operating environment 14 more quickly than if no parameters were retained in the device driver 22. Each device driver 22, in a suspended state, suspends communication with its respective device 24 via signal 34, during the suspend state.

It is advantageous if operating environment portion 14 and device drivers 22 are placed in a low power consumption state during the suspended state. Placing the operating environment portion 14 and the device drivers 22 in a low power consumption state conserves battery power and prolongs battery life (particularly advantageous in hand held radios). Placing operating environment portion 14 and device drivers 22 in a low power state may include completely removing power from the operating environment portion 14 and the device drivers 22, providing residual power to maintain an electrical charge on selected electronic devices (e.g., capacitors, memory devices, programmable gate arrays, time of day clocks, and liquid crystal displays), stopping a device clock (e.g., microprocessor clock), slowing the clock speed of a device clock, or a combination thereof.

The hardware components 24 of the hardware portion 16 are turned off via the hardware power signal 32 at step 68. Turning off the hardware components 24 may comprise removing all power from the hardware components 24, or may optionally comprise maintaining residual power to selected electronic devices (e.g., capacitors) within selected hardware components 24. Providing residual power to the hardware components 24 allows the hardware components 24 to become fully operation upon power restoration more quickly than if electronic devices, such as capacitors, were completely depleted of an electronic charge.

If the selected power status is on, as determined at step 62, power is provided to the hardware components 24 of the hardware portion 16 at step 70, the operating environment portion 14 (along with respective device drivers 22) is restored to either the previous state or a predetermined state at step 72, and the application portion 12 (along with respective device drivers 22) is restored to either the previous state or a predetermined state at step 74.

Power is restored to the hardware portion 16 by power control portion 18 at step 70. Also, if any other processing portions were configured to be in a suspended state (via signal 52), then those processing portions are supplied power and/or sent a control signal to resume processing (via the signal 52).

The operating environment portion 14 receives instructions to resume processing (restored from a suspended state) via the signal 36 at step 72. In one embodiment, the operating environment portion 14 is restored to the previous fully function state. For example, if FM voice was the application that was configured to be in a suspended state, FM voice would be restored using the parameters retained in the operating environment portion 14 associated with FM voice. In another embodiment, the operating environment portion 14 is restored to a state to facilitate the restoration of a predetermined application using retained parameters associated with that predetermined application. This predetermined application may be the same predetermined application described above with respect to restoration of the application portion 12. The respective device drivers 22 are restored from their respective suspended states at step 74, and communication between the operating environment portion 14 and the respective device drivers 22 is resumed via signals 46 and 28. Also, communications between those device drivers 22 and their respective drivers 24 is resumed via signals 34.

The "fast-on" control portion 20 receives instructions to resume processing via the signal 56, responsive to the power status signal 30. The application portion 12 receives instructions to resume processing (restored from a suspended state) via the signal 40 at step 74. In one embodiment, the application portion 12 is restored to the previous fully function state. For example, if FM voice was the application that was configured to be in a suspended state, FM voice would be restored using the retained parameters associated with FM voice (e.g., filter coefficients and center frequency). In another embodiment, the application portion 12 is restored to a predetermined application using retained parameters associated with that predetermined application. The predetermined application is configured to become fully operational more quickly than applications that do not utilize retained parameters. An example of such a predetermined application is an emergency transmission application. For example, if the operator of a hand held radio is under attack, the operator may want to turn the hand held radio on to send a message indicating his position and that he needs help. In this situation, it is desired that the hand held radio not take too long to become fully functional. Thus, a predetermined application, such as an emergency transmission application transmitting a position and a code indicating help is needed, may reside in the application portion 12 and become fully operational when the operator turns the radio on. This emergency application may become operational in response to a designated action by the operator (e.g., designated emergency on switch) or may become fully functional each time the operator turns the radio on. In yet another embodiment, an predetermined application (e.g., emergency application) may be configured and be fully functional while a previously fully functional state is be restored. The respective device drivers 22 are restored from their respective suspended states at step 70, and communication between the application portion 12 and the respective device drivers 22 is resumed via signals 46 and 48. Also, communications between those device drivers 22 and their respective drivers 24 is resumed via signals 34.

A technique for decreasing the amount of time needed to turn on a software-defined radio as described herein, provides an operator of the radio the ability to turn the radio off and on utilizing a standard off/on switch. Thus the herein-described technique is transparent to the operator. In one embodiment, the operator is provided the opportunity to restore the radio to the previous state (previous to turning the radio off) or to a predetermined state, such as emergency transmission. This technique provides low power consumption of the radio's battery while in the suspended state, provides the flexibility and programmability of software-defined radios, and provides power on times that are less than power on times associated with software-defined radios not utilizing this technique.

The technique for decreasing the amount of time needed to turn on a software-defined radio as described herein may be embodied in the form of computer-implemented processes and system for practicing those processes. The technique for decreasing the amount of time needed to turn on a software-defined radio as described herein may also be embodied in the form of computer program code embodied in tangible media, such as floppy diskettes, read only memories (ROMs), CD-ROMs, hard drives, high density disk, or any other computer-readable storage medium, wherein, when the computer program code is loaded into and executed by a computer, the computer becomes a system for practicing the invention. The technique for decreasing the amount of time needed to turn on a software-defined radio as described herein may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes a system for practicing the invention. When implemented on a general-purpose processor, the computer program code segments configure the processor to create specific logic circuits.

Although illustrated and described herein with reference to certain specific embodiments, the technique for decreasing the amount of time needed to turn on a software-defined radio as described herein is nevertheless not intended to be limited to the details shown. Rather, various modifications may be made in the details within the scope and range of equivalents of the claims and without departing from the spirit of the invention.

What is claimed is:

1. A method for decreasing power-on time of a software-defined radio comprising a hardware portion, an application portion, and an operating environment portion, said method comprising:

in response to a power-off signal, removing electrical power from at least one hardware component of said hardware portion;

in response to said power-off signal, configuring said application portion to be in an application portion suspended state, wherein:

selected application parameters are retained in said application portion;

in response to said power-off signal, configuring said operating environment portion to be in an operating environment suspended state, wherein:

selected operating environment parameters are retained in said operating environment portion;

in response to a power-on signal, restoring power to said at least one hardware component of said hardware portion;

in response to said power-on signal, restoring said application portion to an application portion operational state utilizing said retained selected application portion parameters;

in response to said power-on signal, restoring said operating environment portion to an operating environment portion operational state utilizing said retained selected operating environment parameters.

2. A method in accordance with claim 1, further comprising:

in response to said power-off signal configuring said software-defined radio to be in a low power consumption state.

3. A method in accordance with claim 2, wherein said low power consumption state includes providing residual power to selected portions of said software-defined radio for maintaining an electrical charge on selected electronic devices.

4. A method in accordance with claim 1, wherein:

said application portion operational state comprises one of a previously configured application portion operational state and a predetermined application portion operational state; and said operating environment portion operational state comprises one of a previously configured operating environment portion operational state and a predetermined operating environment portion operational state.

5. A method in accordance with claim 1, wherein:

said software-defined radio includes at least one application selected from the group consisting of an emergency transmission application, FM voice, data communications, global positioning system (GPS) position transmission, and frequency hopping.

6. A method in accordance with claim 1, wherein:

said hardware components comprise at least one of a transmitter, a receiver, an analog to digital converter, a digital to analog converter, a demodulator, and a modulator.

7. A system for decreasing power-on time of a software-defined radio, said system comprising:

a power control portion configured to receive a selected power status of said software-defined radio and one of provide power to selected portions of said software-defined radio and remove power from selected portions of said software-defined radio in response to said selected power status;

a fast-on control portion configured to configure selected portions of said software-defined radio to be in one of a suspended state and an operational state in response to said selected power status;

an application portion comprising radio related applications, wherein selected radio related applications are configured to be in one of a suspended state and an operational state responsive to said selected power status;

an operating environment portion comprising radio related software portions, wherein:

selected radio related software portions are configured to be in one of a suspended state and an operational state responsive to said selected power status; and a hardware portion comprising hardware components, wherein:

power to selected hardware components is one of provided and removed in response to said selected power status.

8. A system in accordance with claim 7, wherein:

selected portions of said software-defined radio are configured to be in a low power consumption state concurrent with said selected radio related applications and said selected radio related software portions being configured to be in said respective suspend states.

9. A system in accordance with claim 7, wherein:

said power control portion is configured to provide residual power to selected portions of said software-defined radio for maintaining an electrical charge on selected electronic devices.

10. A system in accordance with claim 7, wherein:

said software-defined radio includes at least one application selected from the group consisting of an emergency transmission application, FM voice, data communications, global positioning system (GPS) position transmission, and frequency hopping; and said hardware components comprise at least one of a transmitter, a receiver, an analog to digital converter, a digital to analog converter, a demodulator, and a modulator.

11. A computer readable medium encoded with a computer program code for decreasing power-on time of a software-defined radio comprising a hardware portion, an application portion, and an system environment portion, said program code comprising:

a first code segment for causing a processor to remove electrical power from at least one hardware component of said hardware portion, in response to a power-off signal;

a second code segment for causing said processor to configure said application portion to be in an application portion suspended state in response to said power-off signal, wherein:

selected application parameters are retained in said application portion;

a third code segment for causing said processor to configure said operating environment portion to be in an operating environment portion suspended state in response to said power-off signal, wherein:

selected operating environment parameters are retained in said operating environment portion;

a fourth code segment for causing said processor to restore power to said at least one hardware component of said hardware portion in response to a power-on signal;

a fifth code segment for causing said processor to restore said application portion to an application portion operational state utilizing said retained selected application portion parameters in response to said power-on signal; and a sixth code segment for causing said processor to restore said operating environment portion to an operating environment portion operational state utilizing said retained selected operating environment parameter in response to said power-on signal.

12. A computer readable medium in accordance with claim 11, wherein said program code further comprises:

a seventh code segment for causing said processor to configure said software-defined radio to be in a low power consumption state in response to said power-off signal.

13. A computer readable medium in accordance with claim 11, wherein:

said low power consumption state includes providing residual power to selected portions of said software-defined radio for maintaining an electrical charge on selected electronic devices.

14. A computer readable medium in accordance with claim 11, wherein:

said application portion operational state comprises one of a previously configured application portion operational state and a predetermined application portion operational state; and said operating environment portion operational state comprises one of a previously configured operating environment portion operational state and a predetermined operating environment portion operational state.

15. A computer readable medium in accordance with claim 11, wherein:

said software-defined radio includes at least one application selected from the group consisting of an emergency transmission application, FM voice, data communications, global positioning system (GPS) position transmission, and frequency hopping.

16. A computer readable medium in accordance with claim 11, wherein:

said hardware components comprise at least one of a transmitter, a receiver, an analog to digital converter, a digital to analog converter, a demodulator, and a modulator.

* * * * *